(12) United States Patent
Nakahara

(10) Patent No.: US 9,294,142 B2
(45) Date of Patent: Mar. 22, 2016

(54) MOBILE TERMINAL, CONTROL METHOD THEREOF, AND NON-TRANSITORY COMPUTER READABLE MEDIUM STORING CONTROL PROGRAM

(71) Applicant: NEC CASIO Mobile Communications, Ltd., Kanagawa (JP)

(72) Inventor: Toru Nakahara, Kanagawa (JP)

(73) Assignee: NEC Corporation, Tokyo (JP)

( * ) Notice: Subject to any disclaimer, the term of this patent is extended or adjusted under 35 U.S.C. 154(b) by 751 days.

(21) Appl. No.: 13/649,054

(22) Filed: Oct. 10, 2012

(65) Prior Publication Data

US 2014/0099997 A1  Apr. 10, 2014

(51) Int. Cl.
| | | |
|---|---|---|
| H04M 1/00 | (2006.01) | |
| H04B 1/3883 | (2015.01) | |
| H04B 1/3827 | (2015.01) | |
| H04M 19/04 | (2006.01) | |
| H04M 19/08 | (2006.01) | |

(52) U.S. Cl.
CPC ............ *H04B 1/3883* (2013.01); *H04B 1/3827* (2013.01); *H04M 19/04* (2013.01); *H04M 19/08* (2013.01)

(58) Field of Classification Search
CPC . H04M 19/04; H04M 19/08; H04M 2215/32; H04M 2250/02; H04M 2250/12; B60L 11/1816; B60L 2250/10; B60L 2250/16; B60L 11/1868
USPC ........ 455/550.1, 552.1, 566, 569.1, 573, 418; 320/103, 108, 112, 114; 345/204, 207, 345/589
See application file for complete search history.

(56) References Cited

U.S. PATENT DOCUMENTS

| | | | |
|---|---|---|---|
| 7,868,583 B2* | 1/2011 | Kim et al. | 320/103 |
| 2009/0122069 A1 | 5/2009 | Furusawa et al. | |
| 2009/0163247 A1* | 6/2009 | Song | 455/566 |
| 2009/0303215 A1 | 12/2009 | Shiozaki | |

FOREIGN PATENT DOCUMENTS

| | | | |
|---|---|---|---|
| JP | 2000-134293 A | 5/2000 |
| JP | 2005-286738 A | 10/2005 |
| JP | 2006-25239 A | 1/2006 |
| JP | 2006-146030 A | 6/2006 |
| JP | 2006-352765 A | 12/2006 |
| JP | 2007-201859 A | 8/2007 |
| JP | 2007-258894 A | 10/2007 |
| JP | 2008-148054 A | 6/2008 |

(Continued)

OTHER PUBLICATIONS

Notification of Reason(s) for Refusal dated Feb. 12, 2014, with English translation.

*Primary Examiner* — Shaima Q Aminzay
(74) *Attorney, Agent, or Firm* — McGinn IP Law Group, PLLC

(57) ABSTRACT

A mobile terminal capable of being connected to a charger according to an exemplary embodiment includes a notification unit that notifies predetermined information by using at least one of an image, lighting, a sound, and a vibration, a charger detection unit that identifies a charger connected to the mobile terminal, and a control unit that controls the notification unit so that the notification unit provides a different notification to a user according to a type of the charger connected to the mobile terminal.

5 Claims, 8 Drawing Sheets

(56) References Cited

FOREIGN PATENT DOCUMENTS

| JP | 2008-219659 A | 9/2008 |
| JP | 2009-025263 A | 2/2009 |
| JP | 2009-124266 A | 6/2009 |
| JP | 2009-200998 A | 9/2009 |
| JP | 2009-300515 A | 12/2009 |
| JP | 2010-11044 A | 1/2010 |
| JP | 2010-28578 A | 2/2010 |

* cited by examiner

MOBILE TERMINAL, CONTROL METHOD THEREOF, AND NON-TRANSITORY COMPUTER READABLE MEDIUM STORING CONTROL PROGRAM

INCORPORATION BY REFERENCE

This application is based upon Japanese patent application No. 2010-239581, filed on Oct. 26, 2010, the disclosure of which is incorporated herein in its entirety by reference.

BACKGROUND OF THE INVENTION

1. Technical Field

This application relates to a mobile terminal, a control method of a mobile terminal, and a non-transitory computer readable medium storing a control program.

2. Background Art

Various control methods have been proposed for the technique for controlling the display screen or the sound of electronic apparatuses. For example, Japanese Unexamined Patent Application Publication No. 2009-025263 discloses a technique used in display devices such as liquid crystal display television sets, in which the brightness of the screen display is gradually increased prior to the alarm setting time, and at the alarm setting time, a sound is output from the display device.

Various control methods have been also proposed in the technique relating to the notification to users in mobile terminals such as mobile phones, such as a notification on a display screen, a ringtone, and lighting of a lamp provided in the housing. For example, Japanese Unexamined Patent Application Publication No. 2008-148054 discloses a technique in which a mobile terminal deletes images and/or text on the display screen that are not necessarily useful for the user.

Japanese Unexamined Patent Application Publication No. 2006-352765 discloses a technique in which determinations on the open/close state of a mobile terminal, on the ambient brightness, and on whether the mobile terminal is being charged or not are made, and the operating mode for incoming calls and emails of the mobile terminal is set to "normal mode" or "bedtime mode" according to the determination result. Japanese Unexamined Patent Application Publication No. 2007-258894 discloses a technique in which when a mobile terminal is set to a silent move, the display color and the brightness of the display screen are controlled according to the ambient brightness or the current position.

Further, Japanese Unexamined Patent Application Publications No. 2008-219659, No. 2005-286738, No. 2006-146030, No. 2009-124266, and No. 2009-300515 disclose a technique in which a mobile terminal automatically adjusts the brightness of the display screen based on information on the ambient brightness, the current time, and/or the like.

Mobile terminals are also used for handling emergency contact or the like. Therefore, they are often placed and used in the bedside when the user is in bed. Further, as the functions of mobile terminals have become more sophisticated and the current consumption has thereby increased, the battery is used more rapidly due to the use in the daytime. As a result, mobile terminals are often charged during the bedtime.

As described previously, Japanese Unexamined Patent Application Publication No. 2006-352765 discloses that the notification method for notifying the user of an incoming call, an incoming email, and the like is changed based on the charging state of the mobile terminal, and that, in particular, the notification is restricted. Note that the notification method includes any indication using at least one of the visual sensation, the auditory sensation, and the tactile sensation that can be recognized by a user, i.e., includes any indication using at least one of an image, lighting, a sound, and a vibration.

However, the inventors of the present application have found out that there is a problem in the technique disclosed in Japanese Unexamined Patent Application Publication No. 2006-352765 that there is a possibility that the change of the operating mode of a mobile phone terminal (change of the notification method for incoming calls and the like, restriction on the display, and the like) based on the bedtime of the user could not work properly. That is, in the technique disclosed in Japanese Unexamined Patent Application Publication No. 2006-352765, it is conceivable that when the mobile phone terminal is being charged in a place other than the bedroom of the user's house (e.g., in an office, a restaurant, and the like) and the place is dimly lit, its operating mode for incoming calls and emails could be set to "bedtime mode" even though the user is staying up. Note that none of Japanese Unexamined Patent Application Publications No. 2009-025263, No. 2008-148054, No. 2007-258894, No. 2008-219659, No. 2005-286738, No. 2006-146030, No. 2009-124266, and No. 2009-300515 discloses any technique for changing the display method for notifying the user of an incoming call, an incoming email, or the like according to the charging state of the mobile terminal.

SUMMARY

An exemplary object of the invention is to provide a mobile terminal, a control method of a mobile terminal, and a non-transitory computer readable medium storing a control program, capable of appropriately controlling a notification to a user according to whether or not the mobile terminal is being charged in a specific place such as user's house, user's bedroom, and the like.

In a first exemplary aspect of the invention, a mobile terminal is capable of being connected to a charger, and includes: a notification unit that notifies predetermined information by using at least one of an image, lighting, a sound, and a vibration; a charger detection unit that identifies a charger connected to the mobile terminal; and a control unit that controls the notification unit so that the notification unit provides a different notification to a user according to a type of the charger connected to the mobile terminal.

In a second exemplary aspect, a control method of a mobile terminal capable of being connected to a charger, includes: identifying a charger connected to the mobile terminal; and changing a notification about predetermined information according to a type of the charger connected to the mobile terminal.

In a third exemplary aspect, a non-transitory computer readable medium stores a control program of a mobile terminal capable of being connected to a charger. This control program of a mobile terminal causes the mobile terminal to execute: a first process of identifying a charger connected to the mobile terminal; and a second process of changing a notification of predetermined information to a user according to a type of the charger connected to the mobile terminal.

With the above-described features, it is possible to provide a mobile terminal, a control method of a mobile terminal, and a non-transitory computer readable medium storing a control program, capable of appropriately controlling a notification to a user according to whether or not the mobile terminal is being charged in a specific place such as user's house, user's bedroom, and the like.

BRIEF DESCRIPTION OF THE DRAWINGS

The above and other aspects, features, and advantages of the present invention will become more apparent from the following description of certain exemplary embodiments when taken in conjunction with the accompanying drawings, in which.

EXEMPLARY EMBODIMENTS

First Exemplary Embodiment

Figure 1:
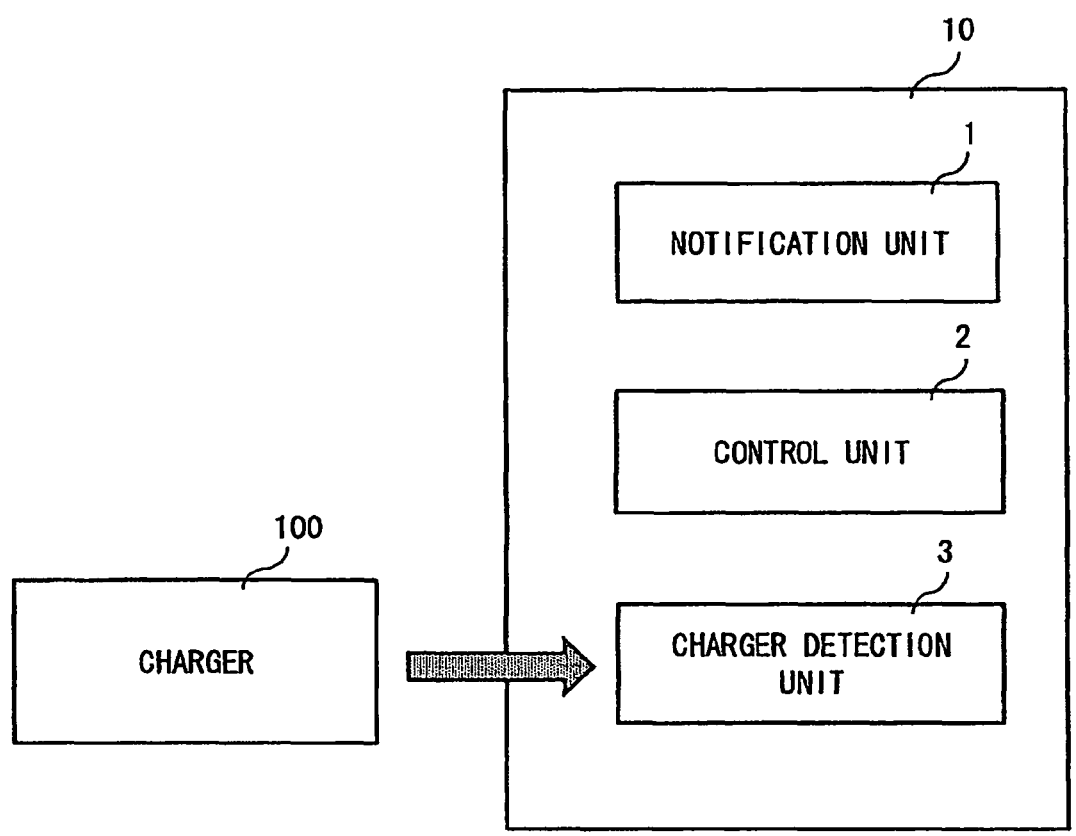
FIG. 1 is a block diagram showing an example of an overall configuration of a mobile terminal according to a first exemplary embodiment.

A first exemplary embodiment is explained with reference to FIG. 1. FIG. 1 is a block diagram showing an example of an overall configuration of a mobile terminal 10 according to this exemplary embodiment. The mobile terminal 10 includes a notification unit 1, a control unit 2, and a charger detection unit 3. Further, the mobile terminal 10 can be connected to a charger 100, and its secondary battery (not shown) disposed inside the mobile terminal 10 can be charged by using the charger 100.

For example, the mobile terminal 10 is a mobile terminal such as a mobile phone, a PHS (Personal Handy-phone System), a mobile information terminal, and a smart phone. For example, the charger 100 is a charger such as an AC adapter, a USB (Universal Serial Bus) charger, a dry-cell adapter, and an auxiliary charging adapter. A part of the charger 100 includes an interface unit (not shown) for the mobile terminal 10, so that the charger 100 is electrically connected to the mobile terminal 10 and thereby can charge the secondary battery disposed inside the mobile terminal 10. Further, the charger 100 may include a tabletop holder, a charging cradle, and the like. The secondary battery disposed inside the mobile terminal 10 may be any secondary battery that is suitable for use in a mobile terminal, such as a lithium-ion secondary battery, a lithium-ion polymer secondary battery, and a nickel-hydrogen rechargeable battery.

The notification unit 1 is a unit that is disposed in the mobile terminal 10 and notifies a user of predetermined information. The notification unit 1 notifies a user of predetermined information by using at least one of an image, lighting, a sound, and a vibration. For example, the notification unit 1 may be a display screen of the mobile terminal 10, a light source provided in the housing of the mobile terminal 10 such as an LED(s) (Light Emitting Diode(s)), a speaker, and/or a vibration unit. Further, "predetermined information" is, for example, information that is notified in ordinary mobile terminals, such as information about an incoming email or incoming call, a current time, a remaining amount of a secondary battery of a mobile terminal, radio wave strength, silent mode setting, and alarm function setting.

The control unit 2 controls the notification unit 1 and thereby notifies a user of predetermined information. Further, the control unit 2 identifies the charger 100 based on information obtained by the charger detection unit 3. Further, the control unit 2 also performs control so that the notification unit 1 provides a different notification to a user according to the type of the charger connected to the mobile terminal. Specifically, the control unit 2 controls the display screen of the notification unit 1, a light source provided in the housing of the mobile terminal 10, the volume of a sound to be output, a vibration operation, and so on. In addition, when a backlight is provided in the key operation unit or the like of the mobile terminal 10, the control unit 2 also controls the lighting of its light source.

The control unit 2 is formed by, for example, a CPU (Central Processing Unit), a ROM (Read Only Memory), a RAM (Random Access Memory), and/or the like disposed inside the mobile terminal 10. For example, the CPU reads programs stored in the ROM or various application programs loaded into the RAM, and thereby controls the mobile terminal 10. In the ROM, various programs used to control the mobile terminal 10 are stored. In the RAM, data that the CPU requires to execute various processes are stored as appropriate. Note that other nonvolatile memories may be also used instead of the ROM.

The charger detection unit 3 identifies the type of the charger connected to the mobile terminal 10 and outputs the information on the charger type to the control unit 2. For example, the charger detection unit 3 has a function of measuring a voltage, and the predetermined charger includes a terminal to be connected to the charger detection unit 3 disposed in the mobile terminal 10 (hereinafter called "identification terminal") in addition to the terminals that are used to charge the secondary battery disposed inside the mobile terminal 10. Note that chargers other than the predetermined charger do not include the identification terminal connected to the ground. Further, in the predetermined charger, the identification terminal is connected to the ground inside the charger.

In the above-described case, when the mobile terminal 10 is connected to the predetermined charger (first charger), the voltage that is measured by the charger detection unit 3 is roughly 0V. This is because the charger detection unit 3 is connected to the identification terminal that is connected to the ground. In contrast to this, when the mobile terminal 10 is connected to a charger (second charger) other than the predetermined charger, the voltage that is measured by the charger detection unit 3 is not roughly 0V. This is because the charger detection unit 3 is not connected to the identification terminal that is connected to the ground. In this example, the charger detection unit 3 obtains the information on whether the connected charger is the predetermined charger or not by measuring the voltage.

The charger detection unit 3 identifies the charger connected to the mobile terminal 10 based on this information. For example, as described above, in the case where the predetermined charger includes the identification terminal connected to the ground and the charger other than the predetermined charger does not include the identification terminal, the control unit 2 identifies the charger as the predetermined charger when the voltage measured by the charger detection unit 3 is roughly 0V and identifies the charger as the charger other than the predetermined charger when the measured voltage is not roughly 0V. In this process, a predetermined threshold is used for the identification process. The charger detection unit 3 outputs this identification result to the control unit 2.

Alternatively, the charger may be equipped with an IC (Integrated Circuit) tag. Therefore, the charger detection unit 3 may identify the charger type by reading the IC tag provided in the charger by using an IC tag reader. That is, the charger detection unit 3 identifies the charger type by determining whether or not the read IC tag is the IC tag of the predetermined charger.

Note that the charger detection unit 3 is formed by, for example, an IC or the like including a CPU, a ROM, a RAM, and so on.

The detailed control performed by the control unit 2 is explained hereinafter. When the charger 100 is connected to the mobile terminal 10, the charger detection unit 3 identifies the type of the charger 100 connected to the mobile terminal 10 as described above. This process is referred to as "first step". The charger detection unit 3 outputs the identification result, i.e., the information about the type of the charger 100 to the control unit 2.

The control unit 2 controls the notification unit 1 so that the notification unit 1 provides a different notification to a user based on the information of the type of the charger 100 output from the charger detection unit 3. This process is referred to as "second step". For example, when the charger detection unit 3 determines that the charger 100 is the predetermined charger, the control unit 2 may control the notification unit 1 in such a manner that the notification unit 1 does not notify at least part of the predetermined information that is supposed to be notified when a charger other than the predetermined charger is connected.

As an example of this control, the control unit 2 may omit part of the information that is to be displayed on the screen display of the notification unit 1. For example, it may erase icons of incoming call/email information, radio wave strength, silent mode setting, and the like. Further, when an incoming call or an incoming email is detected, the control unit 2 may stop the ringtone or the vibration action in the incoming call/email process, prevent the backlight of the key operation unit or the light source provided in the housing of the mobile terminal 10 from being turned on, and/or perform other similar control.

Further, when the charger detection unit 3 determines that the charger 100 is the predetermined charger, the control unit 2 may control the notification unit 1 in such a manner that the notification unit 1 notifies the predetermined information by using a different method from that is used when a charger other than the predetermined charger is connected. As an example of this control, the control unit 2 may lower the display brightness of the screen of the screen display of the notification unit 1. Further, when an incoming call or an incoming email is detected, the control unit 2 may lower the ringtone or the vibration action in the incoming call/email process, lower the lightning of the backlight of the key operation unit or the light source provided in the housing of the mobile terminal 10, and/or perform other similar control. Further, the control unit 2 may notify the user of the incoming call/email information by performing a vibration action or turning on the light source provided in the terminal instead of producing a ringtone.

Alternatively, when the charger detection unit 3 determines that the charger 100 is the predetermined charger, the control unit 2 may control the notification unit 1 in such a manner that the notification unit 1 displays predetermined information that is not displayed when a charger other than the predetermined charger is connected. For example, the control unit 2 may perform control so that a certain operation(s) that is not performed when a charger other than the predetermined charger is connected, such as displaying an icon, producing a ringtone or a vibration, and turning on the light source, is performed. Further, the control unit 2 may increase the display brightness of the screen of the screen display of the notification unit 1, increase the ringtone or the vibration action, or perform other similar control.

When the charger detection unit 3 determines that the charger 100 is not the predetermined charger, the control unit 2 does not perform the above-described special control.

As described above, by connecting the mobile terminal 10 to the predetermined charger, the user can make the mobile terminal 10 provide a different notification from the notification that is supposed to be provided when the mobile terminal 10 is connected with a charger other than the predetermined charger. This predetermined charger is used in a specific place(s) such as user's house and user's bedroom. As an example of an advantageous effect of this exemplary embodiment, it is possible to provide a mobile terminal and a control method of a mobile terminal, capable of appropriately controlling a notification to a user according to whether or not the mobile terminal is being charged in a specific place such as user's house, user's bedroom, and the like.

Second Exemplary Embodiment

Figure 2:
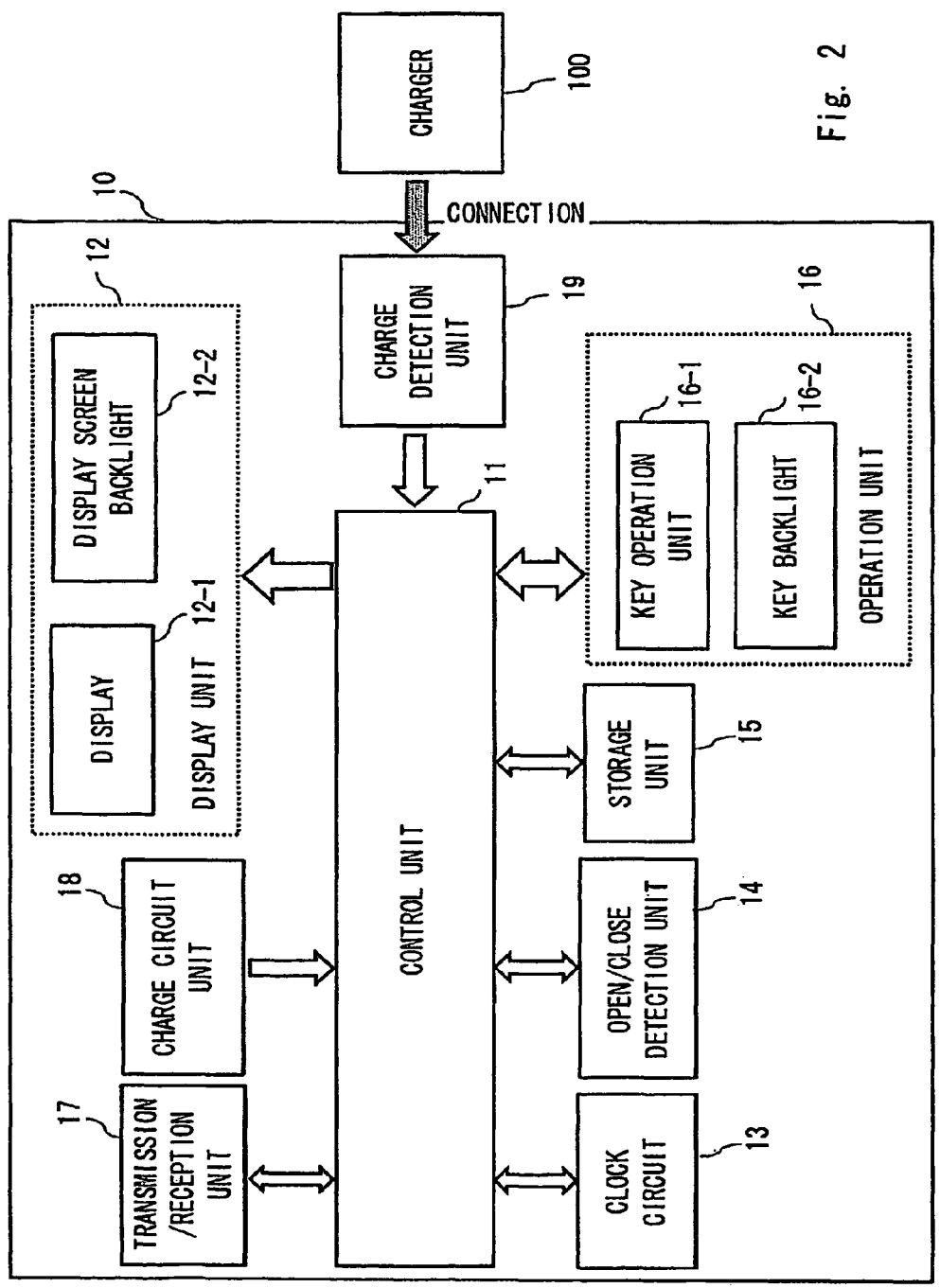
FIG. 2 is a block diagram showing an example of an overall configuration of a mobile terminal according to a second exemplary embodiment.
Figure 3:
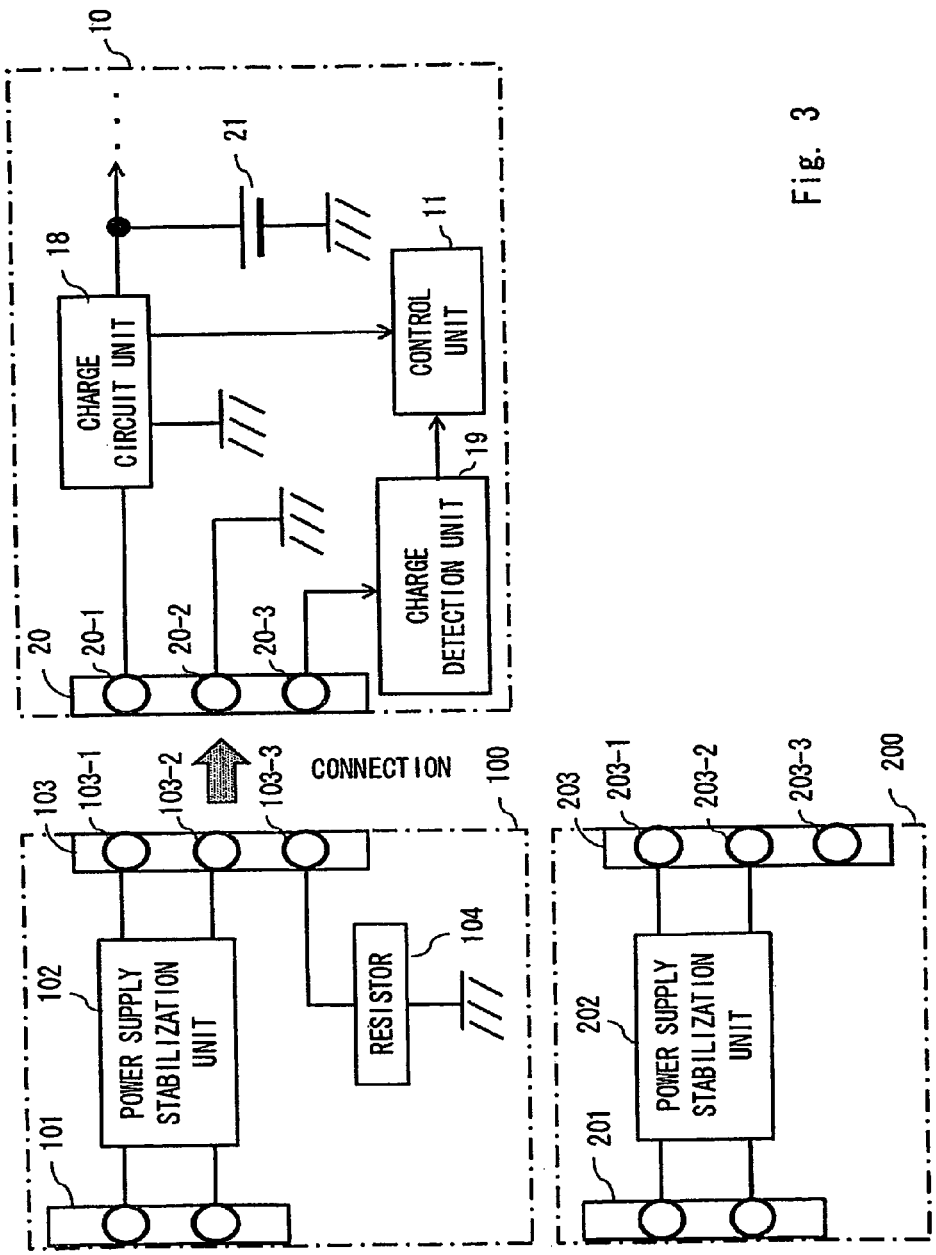
FIG. 3 is a block diagram showing an example of a configuration of a charger and a mobile terminal according to a second exemplary embodiment.
Figure 4:
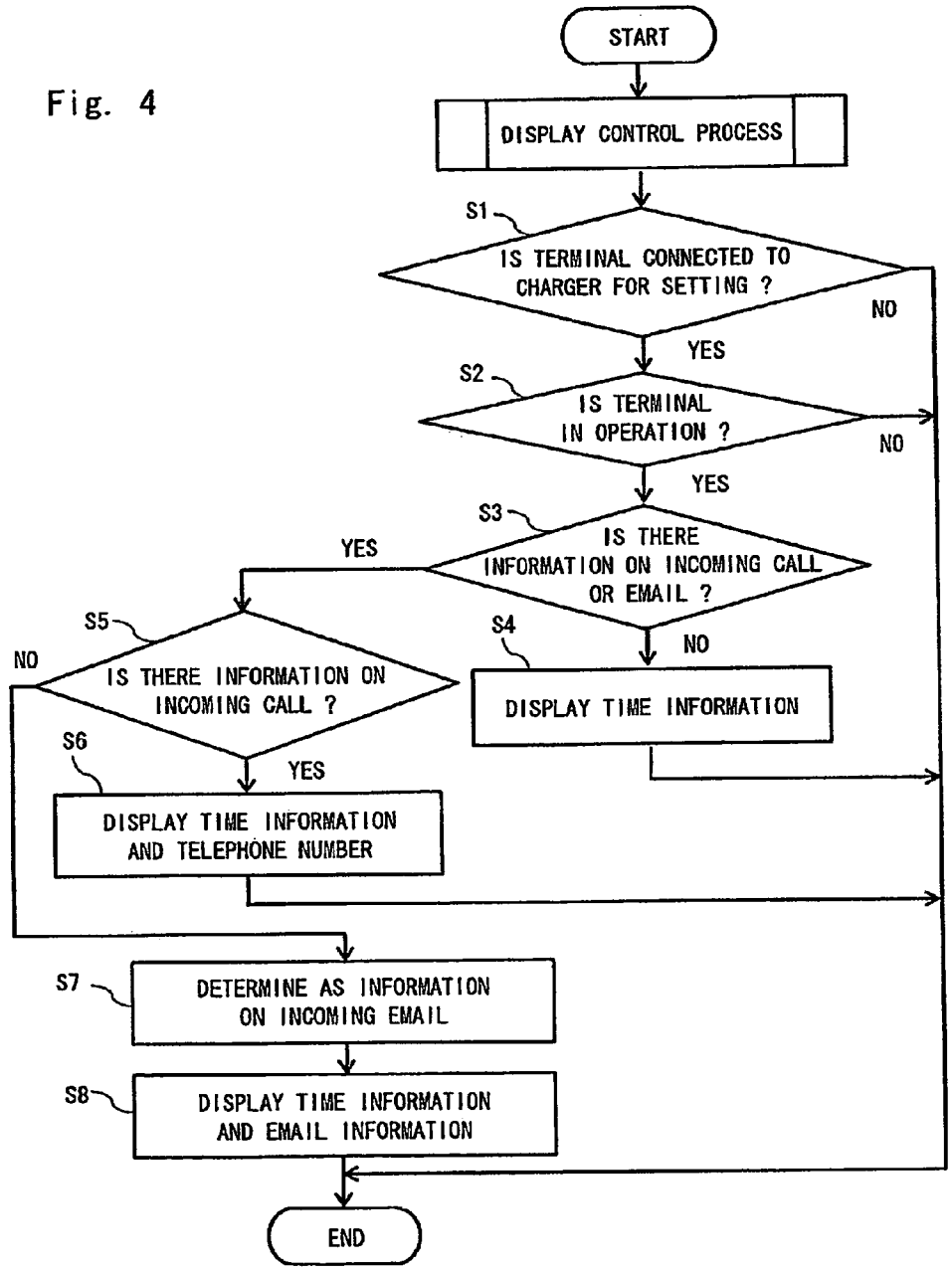
FIG. 4 is a flowchart showing an example of a control flow showing display control according to a second exemplary embodiment.
Figure 5:
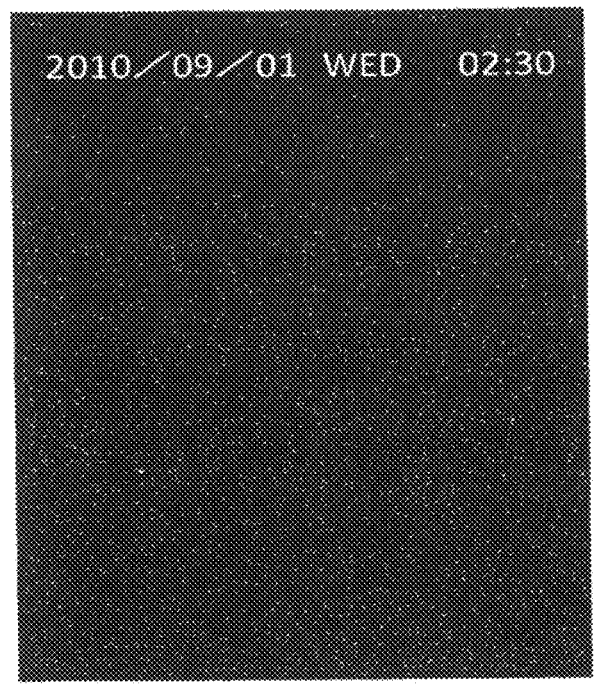
FIG. 5 shows a first example of a screen display according to a second exemplary embodiment.
Figure 6:
FIG. 6 shows a second example of a screen display according to a second exemplary embodiment.
Figure 7:
FIG. 7 shows a third example of a screen display according to a second exemplary embodiment.
Figure 8:
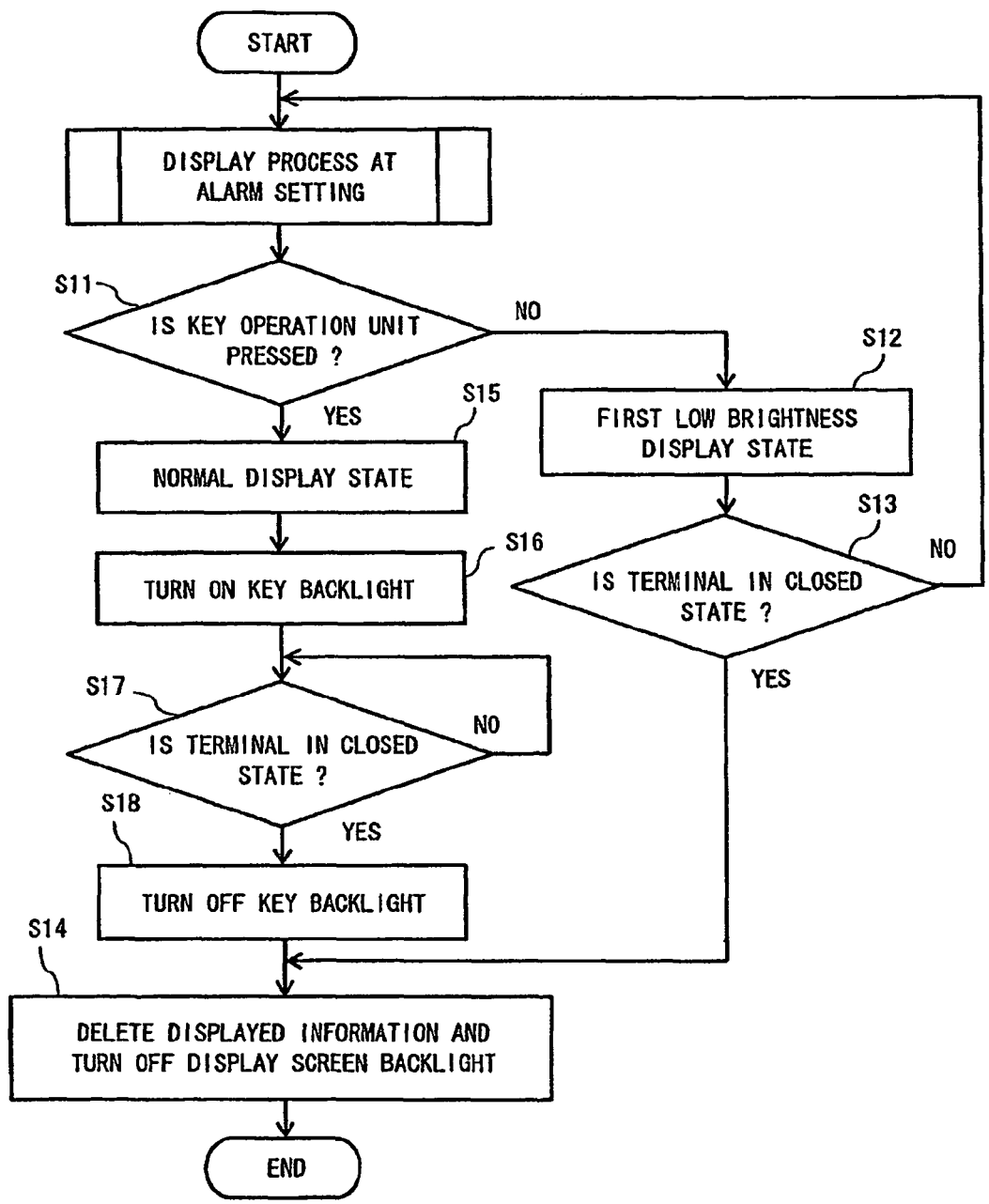
FIG. 8 is a flowchart showing an example of a control flow of control according to a second exemplary embodiment that is performed when a key is pressed.

A second exemplary embodiment is explained with reference to the drawings. FIG. 2 is a block diagram showing an example of an overall configuration of a mobile terminal according to this exemplary embodiment. FIG. 3 is a block diagram showing an example of a configuration of a setting charger and a mobile terminal according to this exemplary embodiment. FIG. 4 is a flowchart showing an example of a control flow showing display control of a screen according to this exemplary embodiment. FIG. 5 shows a first example of a screen display according to this exemplary embodiment, in which only time information and data information are displayed as text information in the screen. FIG. 6 shows a second example of a screen display according to this exemplary embodiment, in which only a time, a date, and an incoming call number are displayed as text information in the screen. FIG. 7 shows a third example of a screen display according to this exemplary embodiment, in which only a time, a date, and an incoming email are displayed as text information in the screen. FIG. 8 is a flowchart showing an example of a control flow showing display control of a screen according to this exemplary embodiment that is performed when a key is pressed.

Note that in this exemplary embodiment, when the mobile terminal is connected to a predetermined charger, the control unit performs control in such a manner that the screen display of the mobile terminal is different from the display that is displayed in the normal operating state. Specifically, the control unit sets the display on the display screen to a low-brightness display state (first low-brightness display state). The control unit displays the background of the display screen with black color and displays the information to be displayed on the display screen with white color. Further, the information to be displayed on the display screen includes only the time information or the information on incoming calls/emails. Hereinafter, the state of the mobile terminal 10 in which this screen display process is performed is referred to as "notification restriction mode".

Firstly, the overall configuration of the mobile terminal 10 according to this exemplary embodiment is explained with reference to FIG. 2. The mobile terminal 10 according to this exemplary embodiment includes a control unit 11, a display unit 12, a clock circuit 13, an open/close detection unit 14, a storage unit 15, an operation unit 16, a transmission/reception unit 17, a charge circuit unit 18, and a charge detection unit 19. In this example, the mobile terminal 10 is a mobile terminal that can be folded in two such as a mobile phone and a PHS. Note that the notification unit 1, the control unit 2, and the charger detection unit 3 of the first exemplary embodiment correspond to the display unit 12, the control unit 11, the control unit 11, and the charge detection unit 19 respectively in FIG. 2. Further, "predetermined charger" in the first exemplary embodiment corresponds to the charger 100 in FIG. 2.

The control unit 11 is a control circuit that presides over the functional control of the mobile terminal 10. In particular, the control unit 11 receives information data output from the display unit 12, the clock circuit 13, the open/close detection unit 14, the storage unit 15, the operation unit 16, the transmission/reception unit 17, the charge circuit unit 18, and the charge detection unit 19, and processes the received information data. Further, the control unit 11 also outputs control data to each unit. Though it is not illustrated in the figure, the control unit 11 is formed by a CPU, a RAM, and the like disposed inside the mobile terminal 10.

The display unit 12 displays images and information in the mobile terminal 10. The display unit 12 can display predetermined information with arbitrary brightness. The display unit 12 includes a display 12-1 that displays information and the like, and a display screen backlight 12-2. The display 12-1 is a display screen of the mobile terminal 10, and in this example, is a liquid crystal display device. Further, the display screen backlight 12-2 is formed by a compact light source, and is formed by a light source such as an LED(s). The display screen backlight 12-2 emits light from the rear side of the display 12-1 and has a function of changing the brightness of the display 12-1.

The display unit 12 performs image control described below. The display unit 12 displays an image(s) on the display 12-1 based on image display information data output from the control unit 11. Specifically, the display unit 12 applies voltages that are determined according to the display image to the display 12-1, which is a liquid crystal display device, and thereby determines the transmission and the shielding of the light emitted by the display screen backlight 12-2. In addition to the above-described control for the display 12-1, the display unit 12 also performs control to adjust the brightness of the display screen backlight 12-2 based on brightness adjustment data sent from the control unit 11. With the above-described configuration, the display unit 12 can change and control the light that is transmitted from the display 12-1 to the user, i.e., the brightness of the screen display. Note that the image display information output from the control unit 11 contains the above-described "predetermined information" in the first exemplary embodiment.

The clock circuit 13 is a clock circuit that counts the time, and has a function of sending time data at the moment at which the control unit 11 requests the time data, to the control unit 11. The clock circuit 13 is formed by an IC or the like including a CPU, a ROM, a RAM and the like. Note that the time data may include, in addition to the current time, information about the current date, the month, and the year.

The open/close detection unit 14 has a function of detecting whether the mobile terminal 10 is in a folded state (hereinafter called "closed state") or in a state where the mobile terminal 10 is not folded and thus the user can see the display unit 12 (hereinafter called "opened state"). The open/close detection unit 14 sends the detected open/close state of the mobile terminal 10 to the control unit 11 as open/close information. For example, when the mobile terminal 10 is in the power-on state and the open/close detection unit 14 detects that the user has unfolded the housing of the mobile terminal 10, the open/close detection unit 14 sends information indicating that the mobile terminal 10 becomes the opened state to the control unit 11. In response to the information indicating that the mobile terminal 10 becomes the opened state, the control unit 11 sends control data to each unit of the mobile terminal 10 for instructing the display unit 12 to display a picture, bringing the key operation unit 16-1 of the operation unit 16 into an input operation available state, and performing other similar control. By doing so, the control unit 11 brings the mobile terminal 10 into a started-up state. The open/close detection unit 14 is formed by an IC or the like including a CPU, a ROM, a RAM and the like.

The storage unit 15 has an area in which information data sent from the control unit 11 is stored, and reads and writes information data under the control of the control unit 11. Further, screen information and the like that are stored in advance in the mobile terminal 10 are also stored in the storage unit 15. The stored information data is data that is used when the mobile terminal 10 is in use. Examples of the stored information data include screen data to be displayed in the display 12-1, brightness data of the display screen backlight 12-2 that is used when that screen data is displayed, and data registered by a user such as time setting, telephone numbers, and email addresses. Note that the storage unit 15 is formed by a ROM, a RAM, or an auxiliary storage device disposed inside the mobile terminal 10.

The operation unit 16 includes a key operation unit 16-1 that is buttons pressed by a user, and a key backlight 16-2 that illuminates the key operation unit 16-1. When a user presses buttons and thereby operates the key operation unit 16-1, information entered by the user is output from the key operation unit 16-1 to the control unit 11. The control unit 11 outputs the information entered by the user into the storage unit 15, so that the entered information is stored inside the mobile terminal 10. Further, the key backlight 16-2 performs a turn-on action and a turn-off action according to control data of the control unit 11, and thereby illuminates the entire operation unit 16. In the state where a user uses the mobile terminal under the normal conditions, the control unit 11 turns on the key backlight 16-2 upon the detection of the start-up of the mobile terminal that is initiated when the housing of the mobile terminal 10 is opened or upon the detection of input information supplied from the key operation unit 16-1 or the like. As a result, the control unit 11 performs control so that the operation unit 16 is brought into such a state that the user can easily see the operation unit 16. Note that the key operation unit 16-1 is keys that are provided in the mobile terminal 10 and used to enter numbers and letters, and is key buttons that are used to implement various application functions such as a telephone function, an email function, a camera function, and an Internet connection function. Further, the light source of the key backlight 16-2 is formed by a circuit that can change the brightness such as an LED(s).

The transmission/reception unit 17 is formed by a radio circuit, and has a function of wirelessly connecting to a base station and transmitting/receiving radio information to/from the base station. The control of the transmission/reception unit 17, including control for taking in an incoming call number and/or an email message, is performed by the control unit 11. For example, when a user enters information of a telephone number by using the key operation unit 16-1, the entered number information is sent out to the control unit 11. In response to the entered number information, the control unit 11 sends control data to the transmission/reception unit 17 so that the transmission/reception unit 17 issues a connection request for a mobile terminal having the entered number to the base station.

The charge circuit unit 18 has a function of controlling the charging of the secondary battery (not shown) disposed inside the mobile terminal 10. Specifically, the control is performed in the following manner. Firstly, when the control unit 11 detects that a charger is connected to the mobile terminal 10, the control unit 11 outputs an instruction indicating that the secondary battery should be charged by using electric power supplied from the charger to the charge circuit unit 18. In response to the instruction from the control unit 11, the charge circuit unit 18 charges the secondary battery. The charge circuit unit 18 monitors the charging status of the secondary battery. Then, when the charging has been finished, the charge circuit unit 18 outputs information about the completion of the charging to the control unit 11. Further, in this process, the control unit 11 outputs an instruction for preventing the overcharging of the secondary battery to the charge circuit unit 18, and the charge circuit unit 18 controls the charging to the secondary battery according to the instruction. The charge circuit unit 18 is formed by, for example, an IC or the like including a CPU, a ROM, a RAM, and so on.

The charge detection unit 19 has a function of, when a charger is connected to the mobile terminal 10, obtaining information about the charger and outputting the information to the control unit 11. In this exemplary embodiment, the charge detection unit 19 has a function of measuring a voltage. The charge detection unit 19 is formed by, for example, an IC or the like including a CPU, a ROM, a RAM, and so on.

The charger 100 can connect with the mobile terminal 10 and thereby charge the secondary battery (not shown) disposed inside the mobile terminal 10. Note that the charger 100 includes a terminal to be connected to the charge detection unit 19 of the mobile terminal 10 (identification terminal) in addition to the terminals that are used to charge the secondary battery disposed in the mobile terminal 10. Further, the identification terminal is connected to the ground inside the charger 100. Details of this feature are explained later with reference to FIG. 3.

Next, a configuration of the charger and the mobile terminal according to this exemplary embodiment is explained. FIG. 3 is a block diagram showing a configuration example of functional blocks of a section of the charger and the mobile terminal relating to the charging process. In FIG. 3, the charger 100 includes an AC (Alternating Current) power supply IF unit 101, a power supply stabilization unit 102, a charge output IF unit 103, and a resistor 104 connected to the ground. A charger 200 is an ordinary charger other than the "predetermined charger", and similarly to the charger 100, includes an AC power supply IF unit 201, a power supply stabilization unit 202, a charge output IF unit 203. However, the charger 200 does not include the resistor connected to the ground. Further, the mobile terminal 10 includes, as the section relating to the charging process, a charge circuit unit 18, a charge detection unit 19, a charge IF unit 20, and a secondary battery 21. Further, the mobile terminal 10 also includes the components of the other units shown in FIG. 2 in addition to the above-described units.

The AC power supply IF unit 101 of the charger 100 is an interface unit of the charger 100 that has a function of a receiving electric power supplied through an AC power line from a wall socket for utility power in an ordinary house, an office, or the like.

The power supply stabilization unit 102 has a function of converting a voltage of the AC power supplied from the AC power supply IF unit 101 into a constant DC (Direct Current) voltage.

The charge output IF unit 103 is an interface unit for the mobile terminal 10. The charge output IF unit 103 is connected to the charge IF unit 20 of the mobile terminal 10 and thereby supplies the mobile terminal 10 with the constant DC voltage output by the power supply stabilization unit 102. Note that the charge output IF unit 103 includes terminals 103-1, 103-2 and 103-3. When the charger 100 is connected to the mobile terminal 10, the terminals 103-1 and 103-2 are connected to terminals 20-1 and 20-2, respectively, of the charge IF unit 20, so that the charge output IF unit 103 supplies electric power to the charge IF unit 20 of the mobile terminal 10. Further, the terminal 103-3 is connected to the resistor 104, which is connected to the ground inside the charger 100. When the charger 100 is connected to the mobile terminal 10, the terminal 103-3 is connected to a terminal 20-3 of the charge IF unit 20. The terminal 103-3 corresponds to the identification terminal described above with the first exemplary embodiment.

The resistor 104 is connected to the ground inside the charger 100. As will be described later, when the charger 100 is connected to the mobile terminal 10, a current supplied from the charge detection unit 19 of the mobile terminal 10 flows to the resistor 104 through the terminal 20-3 and the terminal 103-3. Note that to allow the current to flow from the charge detection unit 19 to the resistor 104, it is desirable that the resistance of the resistor 104 is smaller than the internal resistance of the mobile terminal 10.

In the mobile terminal 10, the charge IF unit 20 is an interface unit for establishing a connection with the charger 100. The charge IF unit 20 is connected to the charge output IF unit 103 of the charger 100, so that a constant DC voltage output from the power supply stabilization unit 102 is supplied to the mobile terminal 10. The charge IF unit 20 includes terminals 20-1, 20-2 and 20-3. The terminal 20-1 is connected to the charge circuit unit 18. The terminal 20-2 is connected to the ground inside the mobile terminal 10. The terminal 20-3 is connected to the charge detection unit 19.

The charge circuit unit 18 receives electric power from the charger 100 through the terminal 20-1 and thereby charges the secondary battery 21 by using this electric power as appropriate. Further, when the charger is connected to the mobile terminal 10, the charge circuit unit 18 detects that a current has flowed from the charger through the terminal 20-1 and outputs the information about the detection of the current to the control unit 11. Further, the charge circuit unit 18 has a function of, in the charging process, controlling the charging to the secondary battery 21 and preventing the secondary battery 21 from overcharging or the like according to an instruction from the control unit 11. The other parts of the charge circuit unit 18 are the same as those described above, and therefore their explanation is omitted here.

The secondary battery 21 is a secondary battery that receives electric power through the charge circuit unit 18 and is thereby charged. Further, the secondary battery 21 supplies electric power to each unit of the mobile terminal 10 shown in FIG. 2. The other parts of the secondary battery 21 are the same as those described above, and therefore their explanation is omitted here.

The charge detection unit 19 measures a voltage and thereby obtains information about the charger connected to the charge IF unit 20. For example, when the charger 100 is connected to the mobile terminal 10, the charge detection unit 19 is connected to the terminal 103-3 of the charger 100 through the terminal 20-3. That is, since the charge detection unit 19 is connected to the resistor 104, which is connected to the ground, a current flows from the charge detection unit 19 to the resistor 104. As a result, the voltage measured by the charge detection unit 19 is roughly 0V. The charge detection unit 19 outputs the information of the voltage measured in the above-described manner to the control unit 11.

As another example, when the charger 200 is connected to the mobile terminal 10, the charge detection unit 19 is connected to the terminal 203-3 of the charger 200 through the terminal 20-3. In this state, since the charge detection unit 19 is not connected to any component, no current flows to the outside of the mobile terminal 10 (i.e., to the charger 200). Therefore, the voltage measured by the charge detection unit 19 does not become roughly 0V. The charge detection unit 19 outputs the information of the voltage measured in the above-described manner to the control unit 11.

That is, the charge detection unit 19 obtains information about whether or not the terminal 20-3 is connected to the predetermined charger, and provides the information to the control unit 11. The other parts of the charge detection unit 19 are the same as those described above.

When a user connects a charger to the mobile terminal 10, the control unit 11 first obtains a notification about the connection with the charger output by the charge circuit unit 18 and then obtains information about the measured voltage from the charge detection unit 19. When the charger 100 is connected to the mobile terminal 10, the resistor 104, which is connected to the ground, is connected to the charge detection unit 19. Therefore, the voltage measured by the charge detection unit 19 is roughly 0V. In this state, the control unit 11 determines the logic level of the measured voltage as a Low level. On the other hand, when the ordinary charger 200 is connected to the mobile terminal 10, there is no resistor 104 connected to the ground. Therefore, the voltage measured by the charge detection unit 19 does not become roughly 0V. In this state, the control unit 11 determines the logic level of the measured voltage as a High level.

As an example of the logic level, when the average output voltage of the secondary battery 21 is 3.6V, the half value 1.8V may be used as a threshold. Therefore, when the voltage measured by the charge detection unit 19 is in a range of 0 to 1.8V, the logic level of the measured voltage may be determined to be a Low level, whereas when the voltage measured by the charge detection unit 19 is in a range of 1.8 to 3.6V, the logic level of the measured voltage may be determined to be a High level. Alternatively, when the voltage measured by the charge detection unit 19 is in a range of 0 to 0.8V, the logic level of the measured voltage may be determined to be a Low level, whereas when the voltage measured by the charge detection unit 19 is in a range of 2.0 to 3.6V, the logic level of the measured voltage may be determined to be a High level. In this case, when the voltage measured by the charge detection unit 19 is in a range of 0.8 to 2.0V, the logic level is regarded as a threshold level between the Low level and High level. By the determination of the logic level as described above, the control unit 11 can determine whether or not the predetermined charger is connected. The control unit 11 performs a display control process of a screen shown in FIG. 4 and the subsequent figures according to the identification result of the charger.

In short, the charger 100 and the mobile terminal 10 are connected through the charge output IF unit 103 and the charge IF unit 20. In this state, the secondary battery 21 is charged by electric power supplied from the charger 100. Further, the resistor 104, which is disposed within the charger 100 and connected to the ground, is connected to the charge detection unit 19 of the mobile terminal 10. The charge detection unit 19 measures the voltage and outputs information about the voltage to the control unit 11. The control unit 11 determines that the logic level of the measured voltage is a Low level and thereby determines that the charger 100 is the predetermined charger.

Next specific display control according to this exemplary embodiment is explained. FIG. 4 shows a control flow showing display control of a screen performed by the control unit 11 according to this exemplary embodiment. Firstly, the control unit 11 determines whether or not the mobile terminal 10 is currently connected to a predetermined charger (charger 100) (step S1). When the control unit 11 determines that the mobile terminal 10 is not connected to the predetermined charger (No at step S1), the control unit 11 does not set the mobile terminal 10 to the above-described notification restriction mode and does perform control in the normal operating mode set by the user. That is, when the mobile terminal 10 is in operation, the control unit 11 controls the display unit 12 so that the display unit 12 displays a picture that is set by the user under the normal conditions. In this state, the brightness of the screen display has the same level as the level that is used by the user under the normal state. Further, the control unit 11 turns on the key backlight 16-2. After performing the above-described processes, the control unit 11 finishes the display control process. Note that the details of the determination method performed by the control unit 11 in the step S1 are the same as those described above.

When the control unit 11 determines that the mobile terminal 10 is connected to the predetermined charger, the control unit 11 determines whether or not the mobile terminal 10 is in operation (step S2). When the control unit 11 determines that the user does not open the housing and the mobile terminal 10 is not in operation (No at step S2), the control unit 11 does not perform the control for the display performed by the display unit 12 and finishes the display control process.

When the control unit 11 determines that the user has opened the housing of the mobile terminal 10 (Yes at step S2), the control unit 11 brings the mobile terminal 10 into an operating state. At this point, the control unit 11 has already set the display unit 12 to the notification restriction mode. Then, the control unit 11 searches the transmission/reception unit 17 for information relating to an incoming call or an incoming email and thereby determines whether or not there is information on an incoming call/email (step S3). When there is no information on an incoming call/email (No at step S3), the control unit 11 reads out information of the time data from the clock circuit 13 and controls the display unit 12 so that the display unit 12 displays the time in the first low-brightness display state (step S4). In this state, the control unit 11 does not perform the control for turning on the key backlight 16-2 and thereby does leave the key backlight 16-2 in the turned-off state. Then, the control unit 11 finishes the display control process.

FIG. 5 is an example of a screen display that is displayed when the display unit 12 displays the time in the first low-brightness display state in the step S4 (first example of screen display). In the screen display shown in FIG. 5, the background is displayed with black color and only the time data is displayed by using white letters. The control unit 11 displays the background by obtaining display data registered in the storage unit 15, in which the background is black color, and sending out control data for displaying the display data, in which the background is black, to the display 12-1. At the same time, the control unit 11 also displays the time data by using white letters in the display 12-1 by obtaining the time data from the clock circuit 13 and performing similar control. Note that the term "black" in this example does not necessarily have to be jet black and may include purple black, ink black, slab black, and so on. Further, the "white", which is the color for the letters, does not necessarily have to be pure white and may include pearl gray, milky white, gray white, and so on. The text information and the background may be displayed with any other colors, provided that the color display of the text information is displayed with a color having higher brightness than that of the color display of the background.

Further, when the control unit 11 performs the screen display shown in FIG. 5, the control unit 11 sets the brightness of the background in the display unit 12 to a dimly-lit state having brightness lower than that in the normal setting (first low-brightness display state). The first low brightness may be any brightness that is lower than the brightness in the normal operating mode. For example, it may be extremely low brightness (minimum brightness or near-minimum brightness) that is substantially the same level as the ambient environment in the case where the ambient environment around the mobile terminal 10 is sufficiently dark such as in the middle of the night. The control unit 11 controls the display 12-1 and the display screen backlight 12-2 so that the brightness of the background of the display unit 12 is set to this first low brightness. Specifically, the control unit 11 lowers the brightness of the display screen backlight 12-2 so that letters displayed on the display screen do no dazzle even in dark environments. That is, the light emitted from the text display part (part having high light transmittance) of the display screen is lowered. In this state, since the light transmittance is low in the background of the display screen, the brightness of the light emitted from the backlight is at a low level. With the above-described configuration, the control unit 11 instructs the display unit 12 to use black color for the background and displays text information with white letters whose brightness is set so that the user is not dazzled.

Note that as for the above-described brightness control, various techniques such as power supply control using a PWM (Pulse Width Modulation) method and dim-light control performed by lowering the applied voltage to an LED(s) have been widely known. For example, when the PWM method is used in this exemplary embodiment, the first low-brightness display state can be easily implemented by increasing the cycle at which the display screen backlight 12-2 is turned on. With the above-described control, the display unit 12 is set to the first low-brightness display state and a picture in which time information is displayed with white letters on the black background is displayed. Further, in this state, the key backlight 16-2 is in a turned-off state.

Next, a case where when the control unit 11 searches the transmission/reception unit 17 for information on an incoming call/email (step S3), the control unit 11 detects information on an incoming call/email (Yes at step S3) is explained. Firstly, the control unit 11 determines whether or not the detected incoming signal is an incoming call from a telephone (step S5). When the control unit 11 determines that the incoming signal is an incoming call from a telephone (Yes at step S5), the control unit 11 instructs the display unit 12 to display information about the telephone number of the caller obtained from the transmission/reception unit 17 together with the time data obtained from the clock circuit 13 in the display unit 12 in the first low-brightness display state (step S6). Similarly to the step S4, the control unit 11 does not perform the control for turning on the key backlight 16-2 and thereby does leaves the key backlight 16-2 in the turned-off state.

FIG. 5 is an example of a screen display that is displayed when the display unit 12 displays a telephone number and time data in the first low-brightness display state in the step S6 (second example of screen display). Note that the control method for the display 12-1 and the display screen backlight 12-2 performed by the control unit 11 are similar to the above-described screen display control method performed in the step S4. With the above-described control, the display unit 12 is set to the first low-brightness display state and a picture in which the time data and the caller's telephone number are displayed with white letters on the black background is displayed as shown in FIG. 6. After performing the above-described processes, the control unit 11 finishes the display control process.

When the control unit 11 determines that the incoming signal is not an incoming call from a telephone in the step S5 (No at step S5), the control unit 11 determines that the detected incoming signal is an incoming email (step S7). The control unit 11 instructs the display unit 12 to display information about the email obtained from the transmission/reception unit 17 together with the time data obtained from the clock circuit 13 in the display unit 12 in the first low-brightness display state (step S8). Similarly to the step S4, the key backlight 16-2 remains in the turned-off state.

FIG. 6 is an example of a screen display that is displayed when the display unit 12 displays information about the reception of an email and time data in the first low-brightness display state in the step S8 (third example of screen display). The control method for the display 12-1 and the display screen backlight 12-2 performed by the control unit 11 are similar to the above-described screen display control method performed in the steps S4 and S6. Note that in the screen display example shown in FIG. 6, when an email is received, the control unit 11 refers to mail address data stored within the storage unit 15, determines whom the incoming email is transmitted from, and displays the obtained information in the display unit 12. With the above-described control, the display unit 12 is set to the first low-brightness display state and a screen in which the time data and the caller's telephone number are displayed with white letters on the black background is displayed as shown in FIG. 7. After performing the above-described processes, the control unit 11 finishes the display control process.

With the above-described control, by charging the mobile terminal 10 by the predetermined charger (charger 100) in a specific place such as user's house, user's bedroom, and the like during the bedtime, the user can view the screen display displaying the optimized information content with the optimized brightness when he/she opens the housing of the mobile terminal 10 to obtain time information and/or information on an incoming call/email immediately after he/she wakes up from the sleep. That is, the user can view the screen in which a notification(s) to the user is appropriately controlled.

In general, when a user uses a mobile terminal immediately after he/she wakes up during the bedtime, the brightness of the screen display of the mobile terminal has been often adjusted to the brightness that the user uses under the normal conditions. In such cases, the user is dazzled by viewing the display screen and thereby feels unpleasantness. This is because the viewability of the display screen significantly depends on the ambient brightness and user's condition. Further, since the screen is displayed with high brightness every time the mobile terminal is started up, wasteful currents are consumed.

In the method in which a user manually adjusts the brightness of the display screen, the user needs to optimize the brightness again and again in order to optimize the display brightness and/or reduce the power consumption, and thus making the mobile terminal inconvenient. Further, once a user sets the brightness of the display screen to high brightness, the user tends to maintain the high-brightness setting after that. In such cases, it is impossible to optimize the display brightness and/or reduce the power consumption.

Further, a number of symbols called "icons" are displayed on the display screen of the mobile terminal. Therefore, a user cannot find necessary information such as time information at the first glance, and thus causing a problem in use that the user continues to find the necessary information on the display of the mobile terminal.

In this exemplary embodiment, since the mobile terminal can be set to such a state that a user views the background that is set to a low brightness state by charging the mobile terminal by using the predetermined charger, the unpleasantness such as that would be otherwise caused when the user views the screen dazzling is alleviated. Further, only the information that is important for the user and thus should be displayed such as time data, a telephone number relating to an incoming call, and information relating to an incoming email is displayed in a format that makes the information stand out, i.e., by using white letters. Therefore, the user can grasp the important information at the first glance. Further, since the brightness of the background is low brightness and the key backlight 16-2 is in the turned-off state, the power consumption of the mobile terminal 10 can be reduced.

Note that when the information on the incoming signal includes both an incoming call and an incoming email, both information items may be displayed in the similar fashion by using white letters on the black background.

Next, control of the control unit 11 in a case where the mobile terminal 10 has been already charged by using the predetermined charger (charger 100) and a user presses one of the keys of the key operation unit 16-1 of the mobile terminal 10 in a state where the housing of the mobile terminal 10 is opened is explained with reference to FIG. 8. Firstly, the control unit 11 determines whether or not the key operation unit 16-1 is pressed by detecting information sent out from the key operation unit 16-1 (step S11).

In a step S11, when it is determined that the user has not pressed any button (No at step S11), the control unit 11 controls the display unit 12 so that the display unit 12 performs the display process while maintaining the above-described screen state in which the information is displayed with white letters on the black background in the first low-brightness display state (step S12).

After the process in the step S12, the control unit 11 determines the open/close state of the mobile terminal 10 based on information supplied from the open/close detection unit 14 (step S13). If it is determined that the mobile terminal 10 is still in the opened state (No at step S13), the control unit 11 retunes to the step S11 and performs the process in the step S11.

In the step S13, if it is determined that the mobile terminal 10 becomes a closed state (Yes at step S13), the control unit 11 performs control so that the display information displayed in the display unit 12 is deleted and the display screen backlight 12-2 is turned off (step S14). That is, the control unit 11 deletes the display in the display unit 12. The control unit 11 restores the mobile terminal 10 to the original state and finishes this control. After this control is finished, when the user opens the mobile terminal 10 again while the mobile terminal 10 is being charged by the predetermined charger, the user views the above-described screen in the first low-brightness display state.

In the step S11, when it is determined that the user has pressed at least one of the keys of the key operation unit 16-1 (Yes at step S11), the control unit 11 controls the display unit 12 so that the display unit 12 interrupts the first low-brightness display state and changes to the normal display state based on the entered information detected by the operation unit 16 (step S15). Further, the control unit 11 controls the key backlight 16-2 and thereby turns on the key backlight 16-2 (step S16). With the above-described control, the mobile terminal 10 returns to the normal operating state. Therefore, even when the mobile terminal 10 is being charged by the predetermined charger, the user can restore the display on the screen and the illumination operation of the key backlight 16-2 to the original state. That is, by pressing a key to use the mobile terminal 10, the user can bring the mobile terminal 10 into the normal operating state and thereby use the mobile terminal 10 in the ordinary fashion.

After the process in the step S16, the control unit 11 determines the open/close state of the mobile terminal 10 based on information supplied from the open/close detection unit 14 (step S17). If it is determined that the mobile terminal 10 is still in the opened state (No at step S17), the control unit 11 retunes to the step S17 and performs the process in the step S17.

In the step S17, if it is determined that the mobile terminal 10 becomes a closed state (Yes at step S17), the control unit 11 performs control so that the key backlight 16-2 is turned off (step S18) and also performs control so that the display information displayed in the display unit 12 is deleted and the display screen backlight 12-2 is turned off (step S14). Through the above-described processes, the control unit 11 restores the mobile terminal 10 to the original state and finishes this control. After this control is finished, when the user opens the mobile terminal 10 again while the mobile terminal 10 is being charged by the predetermined charger, the user views the screen in the first low-brightness display state, which is set based on the notification restriction mode, again.

With the above-described control, the user can restore the mobile terminal 10 to the normal operating state by operating the key operation unit 16-1 even when the mobile terminal 10 is in the screen display state of the first low-brightness display state. Further, by bringing the mobile terminal 10 into the closed state, the user can bring the mobile terminal 10 into the screen display state of the first low-brightness display state, which is set based on the notification restriction mode, again.

Based on the features described above, the mobile terminal according to this exemplary embodiment provides the following advantageous effects. A first advantageous effect is that unpleasantness such as dazzling that is caused when a user views a screen immediately after waking up from the sleep is alleviated. A second advantageous effect is that by displaying only the minimum necessary information on the screen, it is possible to enable a user to recognize the information content at the first glance. A third advantageous effect is that during bedtime, when the mobile terminal is used only to check the time or the information about an incoming call/email but is not operated for the other purposes, the power consumption of the mobile terminal can be reduced. This advantageous effect can be achieved by controlling the illumination of the display screen and the key backlight. Based on the above-described matters, by optimizing the display brightness and the screen display content and thereby reducing the power consumption, it is possible to provide a mobile terminal and a control method of a mobile terminal, capable of appropriately restricting the notification to a user.

Note that the present invention is not limited to the above-described exemplary embodiments and various modifications that can be understood by those skilled in the art can be made to the above-described exemplary embodiments without departing from the spirit and scope of the present invention. For example, the second exemplary embodiment can be modified as described below.

The control unit 11 may perform different control from that is performed in the normal operating mode for the ringtone, the vibration action, and the turning-on action of an LED light provided in the housing of the mobile terminal 10 in addition to the display screen when the mobile terminal 10 is set to the notification restriction mode. That is, when the mobile terminal 10 is set to the notification restriction mode, the control unit 11 may perform various control processes including stopping or extremely-lowering the ringtone, stopping or extremely reducing the vibration action, turning off or extremely lowering the lighting of a LED light(s) provided in the housing of the mobile terminal 10 even when there is information about an incoming call/email. Further, the mobile terminal 10 may be set so that the information about an incoming call/email itself is not notified even when there is an incoming call and/or an incoming email. With the above-described setting, it is possible to optimize even further the setting of the mobile terminal 10 in the state where the user is sleeping such as in the middle of the night.

Examples of the display unit 12 include, in addition to the liquid crystal display device, an organic EL (Electro-Luminescence) display device and an inorganic EL display device.

The operation unit 16 includes, in addition to or instead of the key operation unit and the key backlight, a pointing device such as a touch pad. Alternatively, the operation unit 16 may be an operation unit that is integrally formed with the display of the display unit such as a touch panel. That is, the operation unit 16 may be any component, provided that it is a component that a user can operate and that by operating it, information can be entered into the mobile terminal 10.

Further, an illuminometer may be provided in the mobile terminal 10. Then, when the mobile terminal 10 is being charged with the predetermined charger and the control unit 11 detects that the ambient brightness measured by the illuminometer is equal to or lower than a certain value, the control unit 11 may set the mobile terminal 10 to the notification restriction mode. That is, under a dark environment such as in the middle of the night, when the mobile terminal 10 is being charged by the predetermined charger, the mobile terminal 10 is set to the notification restriction mode. In contrast to this, under a bright environment such as in the daytime, when the mobile terminal 10 is being charged by the predetermined charger, the mobile terminal 10 is set to the normal operating mode.

Alternatively, when the mobile terminal 10 is being charged by the predetermined charger and the current time is in a predetermined time period, the control unit 11 may set the mobile terminal 10 to the notification restriction mode. For example, a user may set a time period from 11 p.m. to 6 a.m. as the predetermined time period. Then, when the mobile terminal 10 is being charged by the predetermined charger and the user starts up the mobile terminal 10 at 0 a.m., the mobile terminal 10 operates in the notification restriction mode. In this case, setting according to the date in addition to or instead of according the time may be also possible.

Further, similar control may be performed by using a system capable of locating the place of the mobile terminal 10 together with the predetermined charger. An example of the system capable of locating the place of the mobile terminal 10 is a position information detection function such as GPS (Global Positioning System) and wireless LAN (Local Area Network). For example, when the control unit 11 detects that the mobile terminal 10 is in user's house and is being charged by the predetermined charger, the mobile terminal 10 may be set to the notification restriction mode.

In the control flow shown in FIGS. 4 and 8, the order of the steps in which the processes are performed may be changed as appropriate. For example, in FIG. 4, either of the step S1 in which it is determined whether or not the mobile terminal 10 is connected to the predetermined charger and the step S2 in which it is determined whether or not the mobile terminal 10 is in operation may be performed before the other step. Further, in the step S5, instead of the presence/absence of incoming call information, the presence/absence of incoming email information may be determined. Further, in FIG. 8, either of the step S15 in which the display unit 12 is controlled to the normal display state and the step S16 in which the key backlight 16-2 is controlled and thereby turned on may be performed before the other step. Further, either of the step S18 in which the key backlight 16-2 is turned off when the terminal is closed in the normal display state and the step S14 in which the display screen backlight 12-2 is turned off may be performed before the other step.

Further, the incoming call/email information to be displayed in the screen may be displayed only when the caller or the sender is included in the list of pre-designated callers or senders. The time data that is displayed when the mobile terminal 10 is set to the notification restriction mode may include only the time information without including information of the date, the month, and the year.

The charger 100 may have such a configuration that the terminal 103-3 is directly connected to the ground without interposing the resistor 104. That is, the charger 100 may be any charger with which a current flows from the charge detection unit 19 of the mobile terminal 10 to the ground through the terminal 103-3 and the voltage measured by the charge detection unit 19 thereby becomes roughly 0V.

Further, when no operation is performed for a certain time period after the display unit 12 performs the display process in the first low-brightness display state, the control unit 11 may stop the operation of the mobile terminal 10. Note that in this case, an example of a method for starting up the mobile terminal 10 again is a method in which the control unit 11 detects information entered by a key operation performed by a user and thereby performs control so that the mobile terminal 10 is started up again.

Further, the control unit 11 may perform such control that text information displayed in the notification restriction mode becomes larger in size than text information displayed in the screen under the normal conditions so that a user can view the information more easily. Further, in the notification restriction mode, the key backlight 16-2 may be controlled so that the key backlight 16-2 illuminates at low brightness instead of being completely turned off.

Further, in FIG. 8, when a user presses the key operation unit in the first low-brightness display state, the screen is controlled to the normal display state (step S15 in FIG. 8). However, the control unit 11 may not set the screen to the normal display state immediately, but may first set the background to second low brightness that is higher than the first low brightness but is lower than the brightness of the normal screen display state. This screen display state is referred to as "second low-brightness display state". This process is performed in order to prevent a user from feeling the unpleasantness such as dazzling that would be otherwise caused when the user suddenly views the background with the normal brightness. Note that in consideration of the situation that the user uses the mobile terminal on a full-scale basis, it is desirable that the screen display content that is displayed in the normal use state should be displayed in this situation. After the control unit sets the screen display to the second low-brightness display state, the control unit may continue the screen display process with that brightness or may gradually increase the brightness of the background and eventually set to the normal brightness.

When the user presses the key operation unit in the first low-brightness display state, the control unit may not set the screen to the normal display state immediately or the second low-brightness display state immediately, but may perform control so that the background is gradually restored to the normal brightness.

Note that the cases where the mobile terminal is started up when the housing of the mobile terminal is opened/closed have been explained above with the first and second exemplary embodiments. However, it is obvious that similar control to the above-described control can be also applied to mobile terminals that are started up when the housing is horizontally slid, or to straight-type mobile terminals that do not have any movable section such as an open/close section and a sliding section and is started up when a key is pressed. For example, in the case of the straight-type mobile terminal, when a button of the mobile terminal is pressed once in a state where the notification restriction mode is effective and the operation has been stopped, the display screen may be displayed in the above-described first low-brightness display state. Then, a button of the mobile terminal pressed again, the first low-brightness display state may be cancelled and the normal display screen may be displayed. Further, similar control is also applied to touch-panel-type mobile terminals (in which the display unit and the operation unit are located physically in the same place) in which an operation is performed by touching a finger on the display unit.

Further, it is also conceivable that another display screen such as another liquid crystal display different from the display unit in the first and second exemplary embodiments is provided in some place on the housing surface of the mobile terminal (e.g., on the rear side to the display unit). Screen control similar to that in the second exemplary embodiment can be also performed for such additional display screens.

As an example of the control method, it is possible to make a mobile terminal execute the process flow shown in the first or second exemplary embodiment. For example, it is possible to make a mobile terminal execute the process flow as a control program.

Note that the control program that is executed in a mobile terminal can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM, CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the control program to a computer via a wired communication line (e.g. electric wires, and optical fibers) or a wireless communication line.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A mobile terminal capable of being connected to a charger, comprising:
   a notification unit that notifies predetermined information by using at least one of an image, lighting, a sound, and a vibration;
   a charger detection unit that identifies the charger connected to the mobile terminal; and
   a control unit that controls the notification unit so that the notification unit provides a different notification to a user according to a type of the charger connected to the mobile terminal, and wherein
   the charger detection unit determines whether a charger connected to the mobile terminal comprises a first charger or a second charger, and
   when the charger connected to the mobile terminal comprises the first charger, the control unit controls the notification unit so that the notification unit does not notify at least part of the predetermined information that is supposed to be notified by the notification unit when the charger connected to the mobile terminal comprises the second charger.

2. The mobile terminal according to claim 1, wherein
   the charger detection unit determines whether a charger connected to the mobile terminal comprises a first charger or a second charger, and
   when the charger connected to the mobile terminal comprises the first charger, the control unit controls the notification unit so that the notification unit notifies the predetermined information by using a different notification method from a notification method for the predetermined information that is used when the charger connected to the mobile terminal comprises the second charger.

3. The mobile terminal according to claim 2, wherein when the charger connected to the mobile terminal comprises the first charger, the control unit controls a display screen of the notification unit so that information is displayed in the display screen with a color having higher brightness than that of the color with which a background of the display screen is displayed.

4. A control method of a mobile terminal capable of being connected to a charger, the control method comprising:
   identifying the charger connected to the mobile terminal; and
   changing a notification of predetermined information to a user according to a type of the charger connected to the mobile terminal, wherein
   the identifying comprises determining whether a charger connected to the mobile terminal comprises a first charger or a second charger, and
   the charging comprises, when the charger connected to the mobile terminal comprises the first charger, not notifying at least part of the predetermined information that is supposed to be notified when the charger connected to the mobile terminal comprises the second charger.

5. A non-transitory computer readable medium storing a control program of a mobile terminal capable of being connected to a charger, wherein the control program causes the mobile terminal to execute:
- a first process of identifying the charger connected to the mobile terminal; and
- a second process of changing a notification of predetermined information to a user according to a type of the charger connected to the mobile terminal, wherein
- the first process comprises determining whether a charger connected to the mobile terminal comprises a first charger or a second charger, and
- the second process comprises, when the charger connected to the mobile terminal comprises the first charger, not notifying at least part of the predetermined information that is supposed to be notified when the charger connected to the mobile terminal comprises the second charger.

* * * * *